United States Patent
Kawase (10) Patent No.: US 11,584,447 B2
(45) Date of Patent: Feb. 21, 2023

(54) ELECTRIC VEHICLE STRUCTURE

(71) Applicants: TOYOTA JIDOSHA KABUSHIKI KAISHA, Aichi (JP); SUBARU CORPORATION, Tokyo (JP)

(72) Inventor: Kyosuke Kawase, Kazaki (JP)

(73) Assignees: TOYOTA JIDOSHA KABUSHIKI KAISHA, Aichi-Ken (JP); SUBARU CORPORATION, Tokyo (JP)

( * ) Notice: Subject to any disclaimer, the term of this patent is extended or adjusted under 35 U.S.C. 154(b) by 50 days.

(21) Appl. No.: 17/160,380

(22) Filed: Jan. 28, 2021

(65) Prior Publication Data

US 2021/0237806 A1 Aug. 5, 2021

(30) Foreign Application Priority Data

Feb. 5, 2020 (JP) .............................. JP2020-017928

(51) Int. Cl.
| | | |
|---|---|---|
| B60J 7/00 | (2006.01) | |
| B62D 25/20 | (2006.01) | |
| B62D 25/14 | (2006.01) | |
| B62D 25/02 | (2006.01) | |
| B62D 21/15 | (2006.01) | |

(52) U.S. Cl.
CPC ....... *B62D 25/2018* (2013.01); *B62D 25/025* (2013.01); *B62D 25/14* (2013.01); *B62D 25/2036* (2013.01); *B62D 21/15* (2013.01)

(58) Field of Classification Search
CPC .. B62D 25/081; B62D 25/082; B62D 25/088; B62D 25/04; Y02E 60/10; A61P 35/00; A61P 43/00; A61P 35/02; A61K 45/06; A61K 31/454
See application file for complete search history.

(56) References Cited

U.S. PATENT DOCUMENTS

| | | |
|---|---|---|
| 5,002,333 A | 3/1991 | Kenmochi et al. |
| 6,688,676 B1 | 2/2004 | Sato |
| 2002/0195840 A1 | 12/2002 | Mishima et al. |
| 2004/0155487 A1* | 8/2004 | Joaquin ................ B62D 29/008 296/204 |
| 2016/0207568 A1* | 7/2016 | Natsume ............ B62D 25/2036 |
| 2017/0036629 A1* | 2/2017 | Ishizaki ............. B62D 25/2036 |
| 2019/0009661 A1* | 1/2019 | Okamura ............... B62D 21/02 |
| 2019/0217895 A1 | 7/2019 | Kasai et al. |
| 2019/0217896 A1 | 7/2019 | Otoguro et al. |
| 2021/0221239 A1* | 7/2021 | Kawase ................. B60L 50/66 |

(Continued)

FOREIGN PATENT DOCUMENTS

| | | | |
|---|---|---|---|
| CN | 106794879 A | 5/2017 | |
| GB | 2211798 A * | 7/1989 | ......... B60R 13/0815 |
| JP | H9207824 A | 8/1997 | |

(Continued)

*Primary Examiner* — Kiran B Patel
(74) *Attorney, Agent, or Firm* — Hauptman Ham, LLP (57) ABSTRACT

An electric vehicle structure may include a floor panel; a center tunnel disposed at a center of the floor panel in a vehicle width direction, extending along a vehicle front-rear direction, and projecting upward from the floor panel; a dash panel disposed at front ends of the floor panel and the center tunnel; and a front reinforcement attached to an inner surface of a peripheral wall of the center tunnel and extending rearward from the dash panel through the center tunnel.

4 Claims, 4 Drawing Sheets

(56) References Cited

U.S. PATENT DOCUMENTS

2021/0237805 A1* 8/2021 Kawase ............ B62D 25/2045

FOREIGN PATENT DOCUMENTS

| | | | |
|---|---|---|---|
| JP | 2001219873 | A | 8/2001 |
| JP | 2001225766 | A | 8/2001 |
| JP | 200363455 | A | 3/2003 |
| JP | 2019127054 | A | 8/2019 |

* cited by examiner

ELECTRIC VEHICLE STRUCTURE

CROSS-REFERENCE TO RELATED APPLICATION

This application claims priority to Japanese Patent Application No. 2020-17928, filed on Feb. 5, 2020, the entire contents of which are incorporated herein by reference.

TECHNICAL FIELD

The technique disclosed herein relates to an electric vehicle structure comprising a traction motor.

BACKGROUND

Japanese Patent Application Publication No. 2019-127054 describes an electric vehicle structure in which a battery is disposed below a floor panel.

SUMMARY

For an electric vehicle powered by a traction motor, there is no need to dispose an exhaust pipe extending from an engine in the vehicle. Thus, the electric vehicle does not need to ensure a space for the exhaust pipe. As a result, the electric vehicle structure may be designed differently from a structure of a vehicle that is powered by an engine.

Meanwhile, as in the vehicle that is powered by the engine, vehicle strength needs to be ensured even in the electric vehicle from safety perspectives. The disclosure herein discloses art for ensuring vehicle strength in an electric vehicle structure.

The art disclosed herein relates to an electric vehicle structure. The electric vehicle structure may comprise: a floor panel; a center tunnel disposed at a center of the floor panel in a vehicle width direction, extending along a vehicle front-rear direction, and projecting upward from the floor panel; a dash panel disposed at front ends of the floor panel and the center tunnel; and a front reinforcement attached to an inner surface of a peripheral wall of the center tunnel and extending rearward from the dash panel through the center tunnel.

In this electric vehicle, an exhaust pipe, which is an exhaust passage from an engine, is not disposed in the vehicle, thus a space for such an exhaust pipe does not need to be ensured in the center tunnel disposed at the center of the floor panel in the vehicle width direction. Due to this, the center tunnel may be designed to have a low height from perspectives of vehicle weight reduction and enlargement of passenger compartment. The center tunnel is configured to absorb energy of a collision, for example. Therefore, if the center tunnel is designed to have a low height, the center tunnel absorbs less energy. In the above-described electric vehicle structure, the front reinforcement extending rearward from the dash panel through the center tunnel is disposed on the inner surface of the center tunnel. The front reinforcement reinforces the center tunnel and the center tunnel may thus absorb the energy of a collision. As a result, the vehicle strength may be ensured.

Details and further improvements to the art disclosed herein will be described in DETAILED DESCRIPTION below.

DETAILED DESCRIPTION

Some of the features characteristic to an electric vehicle structure disclosed herein will be listed. It should be noted that the respective technical elements are independent of one another, and are useful solely or in combinations.

The electric vehicle structure may further comprise a pair of rockers and a crossmember. The rockers may be respectively disposed on both ends of the floor panel in the vehicle width direction. The crossmember may extend from one of the rockers to another of the rockers on the floor panel and the center tunnel. The front reinforcement may extend up to the crossmember. This configuration allows collision energy absorbed by the front reinforcement to be transferred to the crossmember. Due to this, the collision energy may be absorbed by the crossmember. Further, the crossmember is supported by the pair of rockers. This diminishes displacement of the crossmember by an impact of the collision.

The electric vehicle structure may further comprise a rear reinforcement. The rear enforcement may be connected from above to a rear end of the front reinforcement via the floor panel and extend rearward on an extension line of the front reinforcement from the rear end of the front reinforcement up to a rear end of the floor panel. In this configuration, the reinforcements may be disposed over an entire length of the floor panel in the vehicle front-rear direction. This improves the vehicle strength.

The front reinforcement may comprise a projection that projects toward inside of the center tunnel such that a clearance is provided between the inner surface of the center tunnel and the front reinforcement. The projection may be located at at least a part of the front reinforcement along the vehicle front-rear direction. In this configuration, a linear length of the front reinforcement in its cross section along the vehicle width direction is longer, as compared to that in a configuration where the front reinforcement is disposed along the inner surface of the peripheral wall of the center tunnel. This improves energy absorbing performance against a front-end collision and a rear-end collision.

The front reinforcement may comprise a bend at the projection. The bend may extend along the vehicle front-rear direction. In this configuration, the bend extending in the vehicle front-rear direction may improve strength of the front reinforcement against a load in the vehicle front-rear direction.

Figure 1:
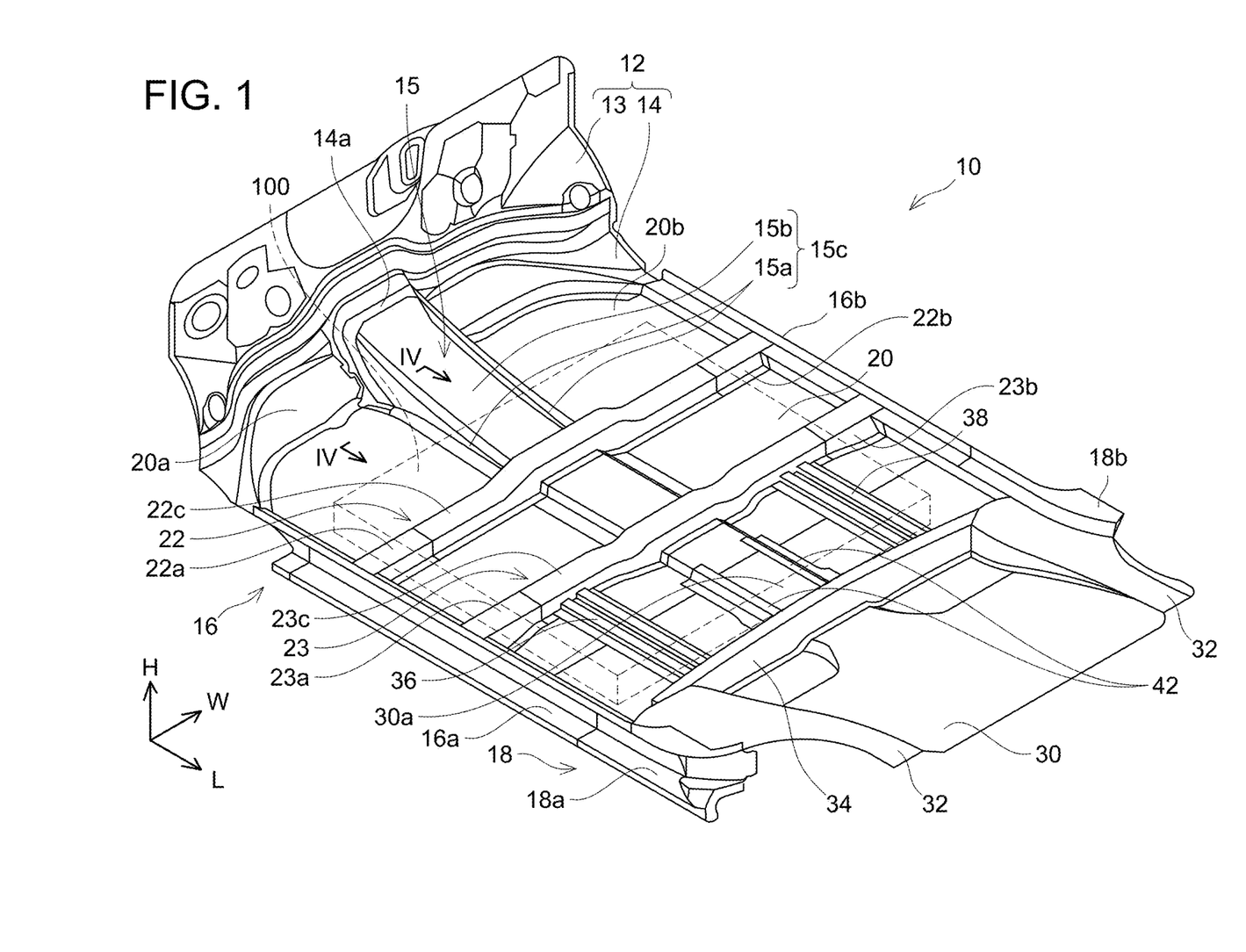
FIG. 1 shows a schematic perspective view of an electric vehicle structure.

FIG. 1 is a perspective view of an electric vehicle structure 10 from above. The electric vehicle structure 10 configures front and bottom portions of a passenger compartment in which an occupant of the electric vehicle is to be seated, and a bottom portion of a luggage room located behind the passenger compartment.

The electric vehicle structure 10 includes a dash panel 12, a center tunnel 15, a pair of rockers 16, a pair of rear rockers 18, a floor panel 20, a rear panel 30, crossmembers 22, 23, a rear crossmember 34, a pair of front reinforcements 40 (see FIG. 2), a pair of rear reinforcements 42 and a battery pack 100. In each of the drawings, positional relationships among the constituent members 12, 15, 16, 18, 20, 30, 22, 23, 34, 40, 42 are suitably shown, however, mounting surfaces to which components of the electric vehicle are to be mounted, openings, beads for reinforcing the panels, and the like, are omitted.

The dash panel 12 is disposed at a front edge of the passenger compartment, and separates the passenger compartment from a front compartment where a power control unit (hereinbelow termed "PCU") and the like are disposed. The dash panel 12 includes an upper dash panel 13 and a lower dash panel 14. The upper dash panel 13 includes one or more openings communicating the front compartment with the passenger compartment. The lower dash panel 14 is disposed below the upper dash panel 13. The lower dash panel 14 is fixed to a lower end of the upper dash panel 13 by welding. The lower dash panel 14 extends from the lower end of the upper dash panel 13 to a lower end of the passenger compartment. Each of the upper dash panel 13 and the lower dash panel 14 is fabricated by processing a single plate.

A lower end of the lower dash panel 14 at a center 14a in a vehicle width direction W is located higher than both ends thereof in the width direction W. The center tunnel 15 is disposed at the center 14a of the lower dash panel 14. A peripheral wall of the center tunnel 15 is configured of a tunnel outer panel 15c. The center tunnel 15 is a space defined by the tunnel outer panel 15c. The tunnel outer panel 15c is attached to the center 14a at the lower end of the lower dash panel 14 by welding.

The tunnel outer panel 15c includes a pair of side panels 15a and an upper panel 15b. The upper panel 15b extends from an edge of the center 14a of the lower dash panel 14 rearward in a vehicle front-rear direction L while being inclined downwardly. The upper panel 15b extends parallel to the front-rear direction L at an intermediate position in the front-rear direction (more specifically, a position rearward of the crossmember 22 to be described later). A bend 15d (see FIG. 4) extending in the front-rear direction L is disposed at each of both edges of the upper panel 15b in the width direction W. Each of the pair of side panels 15a is disposed at corresponding one of the both edges of the upper panel 15b in the width direction W with the corresponding bend 15d interposed therebetween.

The upper panel 15b and the pair of side panels 15a are configured by press-forming a single metal plate. The side panels 15a each extend downward from the upper panel 15b. Lower ends of the side panels 15a are at a certain height. The center tunnel 15 has a space defined by the upper panel 15b and the pair of side panels 15a, and a lower end of the space is open. The center tunnel 15 communicates with the front compartment below the center 14a of the lower dash panel 14.

The floor panel 20 is disposed on both sides of the center tunnel 15 in the width direction W. The floor panel 20 configures a front portion of a floor surface of the passenger compartment. The floor panel 20 is divided into left and right floor portions 20a, 20b. A front end of the left floor portion 20a is fixed to the lower end of the lower dash panel 14 by welding, and a right end of the left floor portion 20a is fixed to a left end of one of the side plates 15a of the center tunnel 15 by welding. A front end of the right floor portion 20b is fixed to the lower end of the lower dash panel 14 by welding, and a left end of the right floor portion 20b is fixed to a right end of the other one of side plates 15a of the center tunnel 15 by welding. As a result, the center tunnel 15 projects upward from the floor panel 20 and has an uplifted shape.

The pair of rockers 16 are respectively disposed on ends of the floor panel 20 in the width direction W. A left rocker 16a is disposed on a left end of the left floor portion 20a. The left rocker 16a is fixed to the left end of the left floor portion 20a by welding. Similarly, a right rocker 16b is disposed on a right end of the right floor portion 20b. The right rocker 16b is fixed to the right end of the right floor portion 20b by welding. A vehicle outer panel, which is omitted in the drawings, is disposed outside of each of the pair of rockers 16 in the width direction W.

Front ends of the pair of rockers 16 are respectively disposed at positions where ends of the lower dash panel 14 in the width direction W are joined to the floor panel 20. Rear ends of the pair of rockers 16 extend beyond a rear end of the floor panel 20. In each of the left rocker 16a and the right rocker 16b, a shape of its cross section parallel to the width direction W is constituted of a first straight line extending substantially parallel to a height direction H, second straight lines that bend and extend outward from both ends of the first straight line in the width direction W, and flanges that bend and extend in the height direction H from outer ends of the second lines in the width direction W. That is, each of the left rocker 16a and the right rocker 16b includes four bends extending in the front-rear direction L.

The two crossmembers 22, 23 are disposed between the pair of rockers 16. The two crossmembers 22, 23 are mounted on the floor panel 20 and the center tunnel 15 and are spaced apart from each other in the front-rear direction L. In a variant, the number of the crossmembers 22, 23 is not limited, and may be one or three or more. Each of the crossmembers 22, 23 is connected to the pair of rockers 16. Due to this, each of the crossmembers 22, 23 is disposed linearly and continuously from the left rocker 16a to the right rocker 16b. A driver's seat disposed in the passenger compartment and a seat disposed next to the driver's seat are attached to the crossmembers 22, 23.

Each of the crossmembers 22, 23 is configured by bending a single plate such that at least four bends extend in the width direction W. More specifically, in each of the crossmembers 22, 23, a shape of its cross section parallel to the front-rear direction L includes an upper panel, a pair of side panels bending and extending downward from the upper panel, and flanges respectively bending and extending from their corresponding side panels.

The crossmember 22 includes member ends 22a, 22b respectively located at ends of the crossmember 22 in the width direction W and a member body 22c extending between the member ends 22a, 22b. Each of this pair of member ends 22a, 22b is fixed to its corresponding one of the pair of rockers 16 by welding. The member end 22a extends from the left rocker 16a to which the member end 22a is fixed on the floor panel 20 along the width direction W. The member end 22b extends from the right rocker 16b to which the member end 22b is fixed on the floor panel 20 along the width direction W. The member ends 22a, 22b are mounted on the floor panel 20 and are fixed to the floor panel 20 by welding.

The member body 22c extends between the pair of member ends 22a, 22b. The member body 22c is in a space defined by the pair of member ends 22a, 22b and the floor panel 20, and is fixed to each of the member ends 22a, 22b by welding. The member body 22c is disposed to extend on the pair of side panels 15a and the upper panel 15b of the center tunnel 15. The member body 22c is fixed to the upper panel 15b and the pair of side panels 15a by welding. Portions of the member body 22c other than its portion fixed to the center tunnel 15 are fixed to the floor panel 20 by welding. A length of the member body 22c in the height direction H is constant over its entirety in the width direction W. Due to this, the portion of the member body 22c that extends on the center tunnel 15 is positioned higher than its portions mounted on the floor panel 20.

The crossmember 23 is disposed rearward of the crossmember 22 and extends on the upper panel 15b of the center tunnel 15 similar to the crossmember 22. Similar to the crossmember 22, the crossmember 23 includes member ends 23a, 23b respectively located at ends of the crossmember 23 in the width direction W and a member body 23c extending between the pair of member ends 23a, 23b. The member end 23b has a similar configuration to that of the member end 22b. The member body 23c has a similar configuration to that of the member body 22c.

The rear panel 30 is disposed at the rear end of the floor panel 20. The rear panel 30 configures the rear portion of the passenger compartment and the bottom portion of the luggage room located behind the passenger compartment. The rear panel 30 is fixed to the floor panel 20 by welding over its entirety in the width direction W. The rear panel 30 includes a tunnel portion 30a having a shape that conforms with a shape of the floor panel 20. The rear panel 30 is gradually inclined upward toward a rear side of the vehicle. Electrical devices such as a motor are disposed below the rear panel 30. Ends of the rear panel 30 in the width direction W are respectively joined to the rockers 16 via rear end panels 32 and the rear rockers 18. The rear panel 30 is fixed to the rear end panels 32 by welding. The rear end panels 32 are fixed to the rear rockers 18 by welding. The rear rockers 18 are respectively fixed to the rear ends of the rockers 16 by welding.

The rear crossmember 34 is disposed at an intermediate position of the rear panel 30 in the front-rear direction L. The rear crossmember 34 is disposed to be spaced apart from the crossmember 23 in the front-rear direction L. The rear crossmember 34 is connected to the pair of rear rockers 18 fixed to the rear ends of the pair of rockers 16. Due to this, the rear crossmember 34 is disposed linearly and continuously between the pair of rear rockers 18.

The rear crossmember 34 is configured by bending a single plate such that at least four bends extend in the width direction W. More specifically, similar to the crossmembers 22, 23, a shape of the cross section of the rear crossmember 34 parallel to the front-rear direction L includes an upper panel, a pair of side panels bending and extending downward from the upper panel, and flanges respectively bending and extending from the side panels. The rear crossmember 34 is fixed to each of the pair of rear rockers 18 by welding. The rear crossmember 34 is mounted on the rear panel 30 and is fixed to the rear panel 30 by welding.

Figure 2:
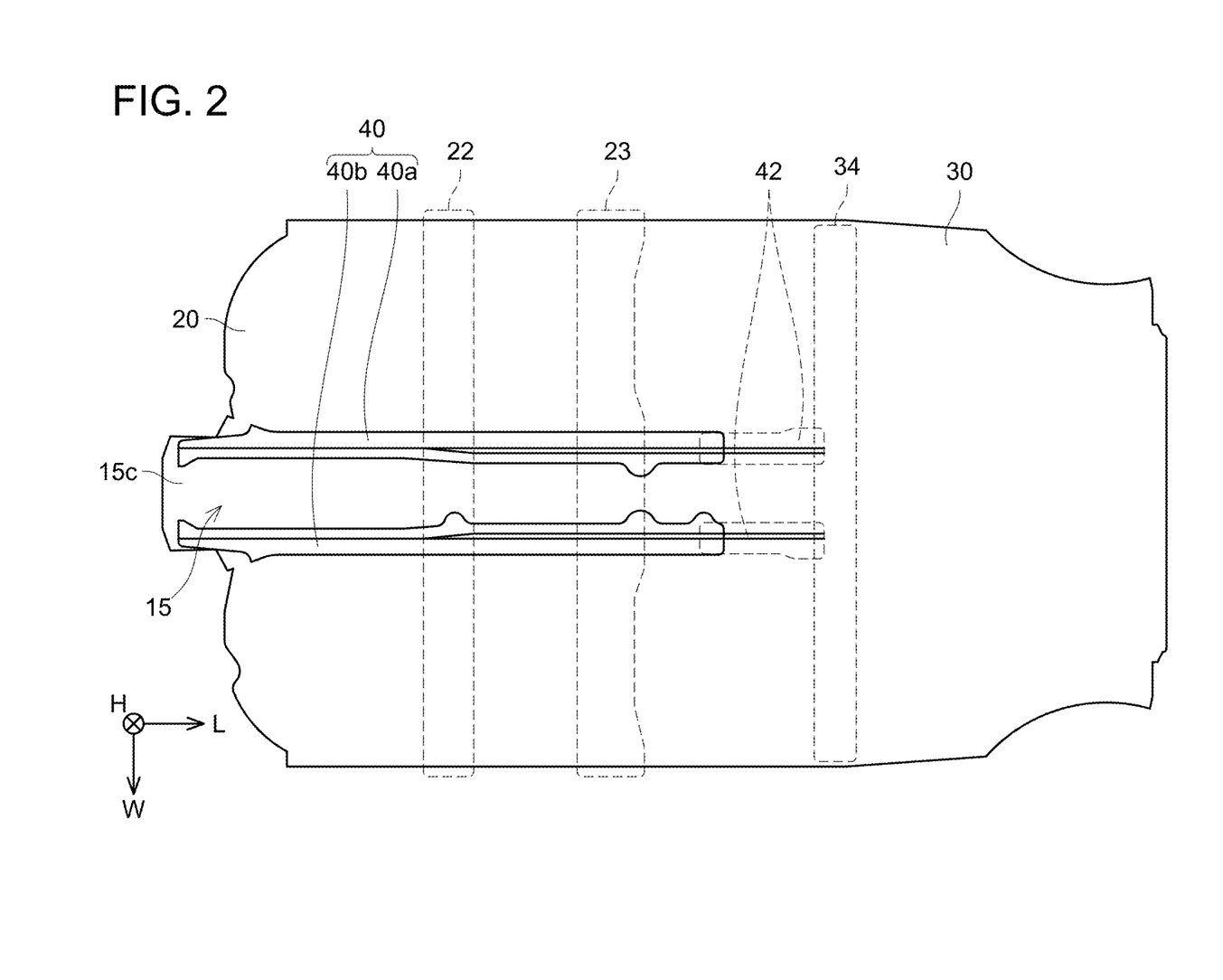
FIG. 2 shows a bottom view of the electric vehicle structure.

FIG. 2 shows a bottom view of the electric vehicle structure 10. For reference, FIG. 2 shows the crossmembers 22, 23 disposed above the floor panel 20 and the rear crossmember 34 disposed above the rear panel 30 in broken lines. Further, FIG. 2 shows the rear reinforcements 42 to be described later in broken lines. In FIG. 2, the pair of rockers 16, the pair of rear rockers 18, and the pair of rear end panels 32 are omitted.

The pair of front reinforcements 40 is disposed in the center tunnel 15. The pair of front reinforcements 40 includes a left reinforcement 40a and a right reinforcement 40b. A front end of the left reinforcement 40a is fixed to the lower dash panel 14 by welding. The left reinforcement 40a extends rearward from the lower dash panel 14 inside the center tunnel 15, that is, below the outer panel 15c. The left reinforcement 40a extends up to the rear end of the floor panel 20 beyond the two crossmembers 22, 23. The left reinforcement 40a is disposed over the entire length of the floor panel 20 in the front-rear direction.

Figure 3:
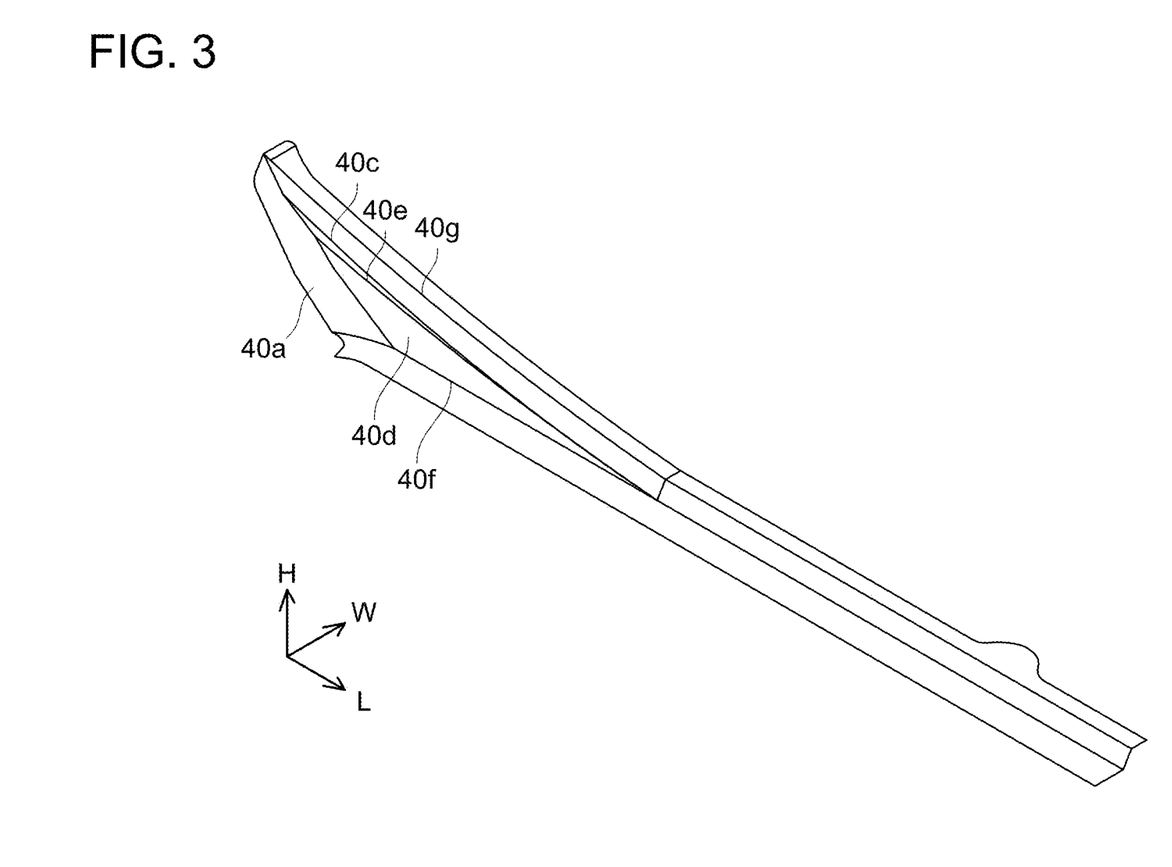
FIG. 3 is an upper perspective view of a front reinforcement.

FIG. 3 shows a perspective view of the left reinforcement 40a from above. The left reinforcement 40a is configured of a flat plate. The left reinforcement 40a bends downward from the upper panel 15b of the center tunnel 15 along one of the bends 15d between the side panel 15a and the upper panel 15b and further bends at a lower end of the side panel 15a to bend toward the outside of the vehicle below a flange 15e at the lower end of the side panel 15a. A front portion of the left reinforcement 40a, that is, a portion thereof from the dash panel 12 to the crossmember 22, and a rear portion of the left reinforcement 40a that is, a portion thereof from the crossmember 22 to the rear end of the floor panel 20 have different shapes of cross sections along the vehicle width direction.

Figure 4:
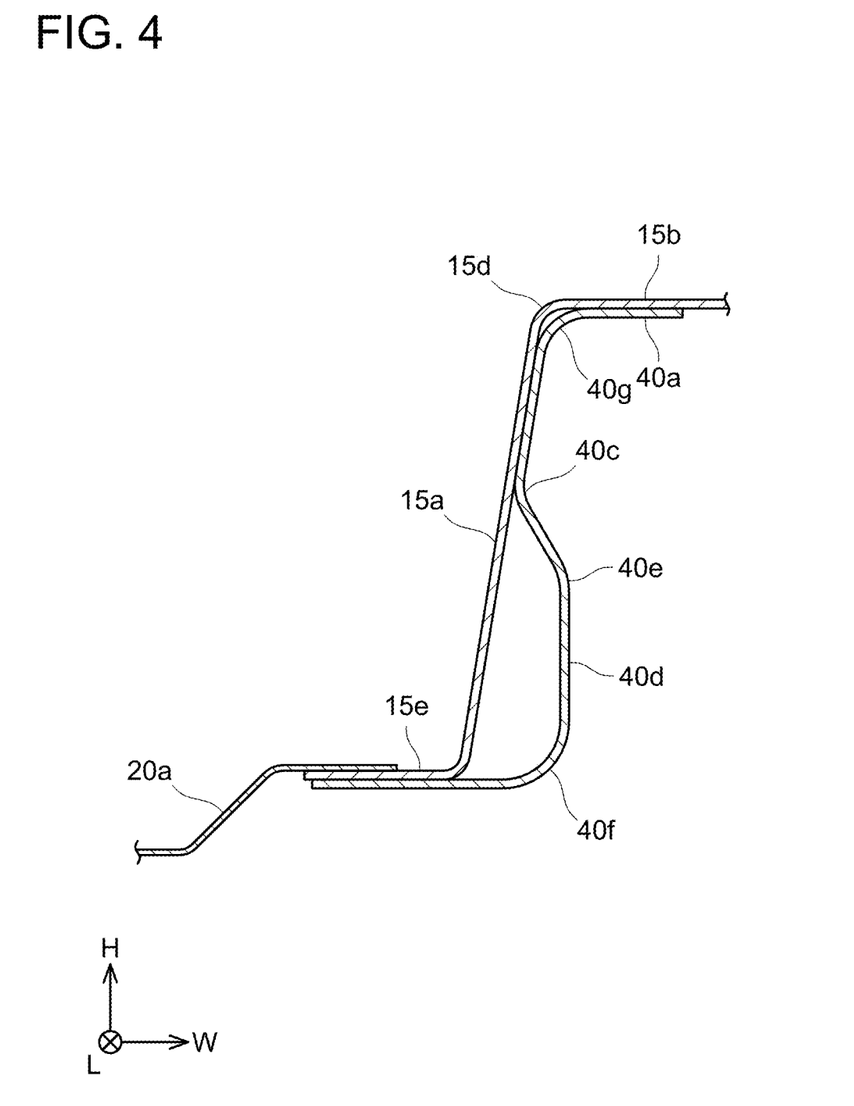
FIG. 4 is a IV-IV cross section in FIG. 1.

FIG. 4 shows the cross section of the front portion of the left reinforcement 40a parallel to the width direction W. In the front portion of the left reinforcement 40a, the left reinforcement 40a is in contact with the upper panel 15b at its portion facing the upper panel 15b. A portion of the left reinforcement 40a facing the side panel 15a is bent downward at a bend 40g from a position overlapping the bend 15d between the upper panel 15b and the side panel 15a and extends along the side panel 15a. The left reinforcement 40a bends toward the inside of the vehicle to separate from the side panel 15a at an intermediate position of the portion facing the side panel 15a. Then, the left reinforcement 40a bends downward after bending toward the inside of the vehicle and further bends at its lower end toward the outside of the vehicle. As above, the left reinforcement 40a includes four bends 40c, 40e, 40f, and 40g that extend in the front-rear direction L. Below the bend 40c, the left reinforcement 40a includes a projection 40d that defines a clearance with an inner surface of the side panel 15a.

The rear portion of the left reinforcement 40a has a shape conforming with the side panel 15a and the upper panel 15b of the center tunnel 15. Two bends extending in the front-rear direction L are disposed in the rear portion of the left reinforcement 40a.

The left reinforcement 40a is fixed to the upper panel 15b by welding at its portion facing the upper panel 15b. Further, the left reinforcement 40a is fixed to the side panel 15a by welding at its portion facing the flange at the lower end of the side panel 15a. Moreover, in the front portion of the left reinforcement 40a, a part of the left reinforcement 40a in the front-rear direction that extends along the side panel 15a is fixed to the side panel 15a by welding.

Further, at positions where the left reinforcement 40a intersects with the crossmembers 22, 23, the left reinforcement 40a, the center tunnel 15, and the crossmembers 22, 23 are welded together in a three-layer stack.

The right reinforcement 40b has a similar configuration to that of the left reinforcement 40a.

As shown in FIG. 1, the rear reinforcements 42 are disposed respectively at rear ends of the front reinforcements 40. The rear reinforcements 42 are disposed above the rear panel 30. The rear reinforcements 42 extend from the rear ends of the left and right reinforcements 40a, 40b to the rear crossmember 34 on extension lines of the front reinforcements 40. Each of the rear reinforcements 42 is configured of a single plate and includes two bends that extend in the front-rear direction from corresponding one of the front reinforcements 40 up to the rear crossmember 34 conforming with the shape of the tunnel portion 30a. A front end of the rear reinforces 42 is welded together with the front reinforcements 40 and the floor panel 20 as parts of the three-layer stacks, an intermediate portion thereof is welded with the rear panel 30 in a two-layer stack, and a rear end thereof is welded with the rear panel 30 and the rear crossmember 34 in a three-layer stack.

Reinforcements 36, 38 connected to the crossmember 23 and the rear crossmember 34 are respectively disposed outward of the rear reinforcements 42. The reinforcements 36, 38 are placed on the floor panel 20 and the rear panel 30.

A plurality of electric cables is arranged in the center tunnel 15. Further, a plurality of pipes is also arranged therein. The electric cables are configured to supplying power of the battery pack 100 to a rear motor disposed below the rear panel 30 from the PCU disposed in the front compartment frontward of the dash panel 12 in the vehicle. In the pipes, coolant for cooling the rear motor disposed below the rear panel 30 flows from a radiator disposed in the front compartment in front of the dash panel 12 in the vehicle.

The battery pack 100 is disposed below the floor panel 20 and the center tunnel 15. The battery pack 100 occupies substantially an entire area below the floor panel 20 and the center tunnel 15. The battery pack 100 is disposed such that a small clearance (such as clearance of 5.0 mm) is provided between the battery pack 100 and the floor panel 20. A ground clearance of the vehicle can remain low by the small clearance between the floor panel 20 and the battery pack 100.

In the electric vehicle of the present embodiment, an exhaust pipe, which is an exhaust passage from an engine, is not disposed in the vehicle. Due to this, the center tunnel 15 simply ensures space for the electric cables and the coolant pipes, but does not need to ensure space for an exhaust pipe. This allows the center tunnel 15 to have a low height, which results in a reduction in the vehicle weight. On the other hand, in the low-height center tunnel 15, a linear length of a cross section of the center tunnel 15 along the width direction W is shorter. As a result, the center tunnel 15 has lower performance in absorbing energy of a frontal collision to the vehicle.

However, since the front reinforcements 40 extending in the vehicle front-rear direction are disposed in the center tunnel 15, the front reinforcements 40 reinforce the center tunnel 15 and the energy of a collision can thus be absorbed. Therefore, the vehicle strength can be ensured.

The front reinforcements 40 extend from the dash panel 12 up to the crossmembers 22, 23. This configuration allows collision energy absorbed by the front reinforcements 40 to be transferred to the crossmembers 22, 23. Due to this, the collision energy can be also absorbed by the crossmembers 22, 23. The crossmembers 22, 23 are supported by the pair of rockers 16. This diminishes displacement of the crossmembers 22, 23 by the collision.

The rear reinforcements 42 are connected to the rear ends of the front reinforcements 40. In this configuration, the reinforcements can be disposed over the entire length of the floor panel 20 in the vehicle front-rear direction. This improves the vehicle strength. Further, rear ends of the rear reinforcements 42 are connected to the rear crossmember 34. This allows energy the front reinforcements 40 received to be transferred to the rear crossmember 34 via the rear reinforcements 42. Therefore, energy of a collision can be dispersed.

In the front portion, each front reinforcement 40 separates from corresponding one of the side panels 15a of the center tunnel 15 and projects toward the inside of the center tunnel 15. In this configuration, a linear length of the front reinforcement 40 in its cross section along the vehicle width direction is longer, as compared to that in a configuration where the front reinforcement 40 is disposed along the side panel 15a. This improves energy absorbing performance of the front reinforcements 40 against a front-end collision and a rear-end collision.

Each front reinforcement 40 is bent such that the bends extend in the front-rear direction. In this configuration, the bends extending in the vehicle front-rear direction can improve strength of the front reinforcements 40 against a load in the vehicle front-rear direction.

Further, the clearances between the front reinforcements 40 and the side panels 15a of the center tunnel 15 are isolated from the passenger compartment by the outer panel 15c of the center tunnel 15. Due to this, positioning holes used to weld the front reinforcements 40 to the combination of the floor panel 20 and the center tunnel 15 may be disposed in the front reinforcements 40, for example. In this configuration, the holes do not need to be closed after the welding.

Specific examples of the present disclosure have been described in detail, however, these are mere exemplary indications and thus do not limit the scope of the claims. The art described in the claims include modifications and variations of the specific examples presented above.

(1) For example, the rear reinforcements 42 may not be disposed at the rear ends of the front reinforcements 40.

(2) The front reinforcements 40 may simply extend up to the crossmember 22 or the crossmember 23, and may not extend beyond the crossmember 23. Further, each front reinforcement 40 may be divided into a plurality of members in the front-rear direction L.

(3) The shape of the cross section of each front reinforcement 40 along the width direction W may conform with the inner surface of the center tunnel 15, or may be other shape such as a partial cylinder shape. The shape of the cross section of each front reinforcement 40 along the width direction W is not limited to the shape in the embodiment.

(4) The front reinforcements 40 in the above embodiment include the left and right reinforcements 40a, 40b that are separate from each other. However, the front reinforcements 40 may include the left and right reinforcements 40a, 40b that are integrated.

Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

What is claimed is:

1. An electric vehicle structure, comprising:
   a floor panel;
   a center tunnel disposed at a center of the floor panel in a vehicle width direction, extending along a vehicle front-rear direction, and projecting upward from the floor panel;
   a dash panel disposed at front ends of the floor panel and the center tunnel; and
   a front reinforcement attached to an inner surface of a peripheral wall of the center tunnel and extending rearward from the dash panel through the center tunnel, wherein
   the front reinforcement comprises a front portion and a rear portion rearward of the front portion in the vehicle front-rear direction,
   the front portion of the front reinforcement comprises a projection that projects toward an inside of the center tunnel such that a clearance exists between the inner surface of the center tunnel and the front reinforcement, the projection is located at a part of the front reinforcement along the vehicle front-rear direction, the rear portion of the front reinforcement comprises a different shape of cross section along the vehicle width direction from a shape of a cross section of the front portion of the front reinforcement along the vehicle width direction, and the rear portion has a shape conforming with the inner surface of the center tunnel.

2. The electric vehicle structure as in claim 1, further comprising:

a pair of rockers, the rockers respectively disposed on both ends of the floor panel in the vehicle width direction; and a crossmember extending from one of the rockers to another of the rockers on the floor panel and the center tunnel, wherein the front reinforcement extends up to the crossmember.

3. The electric vehicle structure as in claim 1, further comprising:

a rear reinforcement connected from above to a rear end of the front reinforcement via the floor panel, wherein the rear reinforcement extends rearward on an extension line of the front reinforcement from the rear end of the front reinforcement member up to a rear end of the floor panel.

4. The electric vehicle structure as in claim 1, wherein the front reinforcement comprises a be at the projection, and the bend extends along the vehicle front-rear direction.

* * * * *